(12) United States Patent
Vazquez

(10) Patent No.: US 8,439,371 B1
(45) Date of Patent: May 14, 2013

(54) DOLLY SYSTEM FOR TRANSPORTING OBJECTS UP AND DOWN STAIRS

(76) Inventor: Jorge Vazquez, Oklahoma City, OK (US)

( * ) Notice: Subject to any disclaimer, the term of this patent is extended or adjusted under 35 U.S.C. 154(b) by 0 days.

(21) Appl. No.: 13/464,954

(22) Filed: May 5, 2012

(51) Int. Cl.
*B62B 5/02* (2006.01)
(52) U.S. Cl.
USPC .......................................... 280/5.22; 180/8.2
(58) Field of Classification Search .................. 180/8.2, 180/8.7, 9.22, 9.34; 280/5.2, 5.22, 5.24, 280/5.32
See application file for complete search history.

(56) References Cited

U.S. PATENT DOCUMENTS

| 3,330,370 | A |  | 7/1967 | Morton |  |
|---|---|---|---|---|---|
| 3,362,496 | A |  | 1/1968 | Landry |  |
| 4,033,421 | A |  | 7/1977 | Ikarimoto |  |
| 4,142,732 | A |  | 3/1979 | Boyd |  |
| 4,312,417 | A |  | 1/1982 | Dalton et al. |  |
| 4,368,896 | A |  | 1/1983 | Ortega |  |
| 4,962,940 | A |  | 10/1990 | Cuschera |  |
| 4,962,941 | A | * | 10/1990 | Rembos | 280/5.22 |
| 5,042,827 | A | * | 8/1991 | Mortenson | 280/5.22 |
| D404,876 | S |  | 1/1999 | Rubinos et al. |  |
| 6,155,362 | A |  | 12/2000 | Owens |  |
| 7,137,464 | B2 | * | 11/2006 | Stahler, Sr. | 180/8.2 |
| 7,520,347 | B2 | * | 4/2009 | Chambliss et al. | 180/8.2 |
| 7,950,673 | B2 | * | 5/2011 | Reed et al. | 280/5.22 |
| 2006/0191724 | A1 | * | 8/2006 | Mairose | 180/8.2 |

* cited by examiner

*Primary Examiner* — Tony Winner

(57) ABSTRACT

An electric dolly system for transporting an object up and down stairs having a base platform connected to a bottom end of support rails, a handle at a top end and a pair of wheels at the bottom end, a track belt wrapped around a first and second rotator component adapted to rotate around the rotator components like a conveyor belt using a motor, the first rotator component is connected to the support rails via a first extension arm and the second rotator component is connected to the support rails via a second extension arm, the first extension arm is positioned closer to the handle and is longer than the second extension arm such that the track belt is at an angle with respect to the support rails.

2 Claims, 4 Drawing Sheets

(Side View)

(Side View)

(Side Motion View)

(Back View)

(ISO Detail View)

(ISO Detail View)

(In-use View)

DOLLY SYSTEM FOR TRANSPORTING OBJECTS UP AND DOWN STAIRS

FIELD OF THE INVENTION

The present invention is directed to a dolly for transporting objects, more particularly to an electric dolly adapted to transport objects up and down stairs.

BACKGROUND OF THE INVENTION

It can be very difficult to carry heavy objects up and down stairs. The present invention features a novel dolly system that allows objects to be transported up and down stairs. The system of the present invention can help avoid lifting-associated injuries and help save time.

SUMMARY

The present invention features a dolly system for transporting objects up and down stairs. In some embodiments, the electric dolly system for transporting an object up and down stairs comprises a base platform connected to a bottom end of support rails, a handle disposed at a top end of the support rails, and a pair of wheels disposed at an intersection of the base platform and the bottom end of the support rails; a track belt wrapped around a first rotator component and a second rotator component, the track belt is adapted to rotate around the rotator components like a conveyor belt, the first rotator component is connected to the support rails of the dolly via a first extension arm and the second rotator component is connected to the support rails of the dolly via a second extension arm, the first extension arm is positioned closer to the handle than is the second extension arm, the first extension arm is longer than the second extension arm such that the track belt is at an angle with respect to the support rails of the dolly; and a motor operatively connected to the second rotator component via a chain; wherein when the motor is activated the motor causes rotation of the track belt about the rotator components.

In some embodiments, the handle can move with respect to the support rails and can be secured in a preferred position. In some embodiments, the first extension arm is collapsible. In some embodiments, the system further comprises a track tensioner operatively connected to the track belt for adjusting tension of the track belt.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
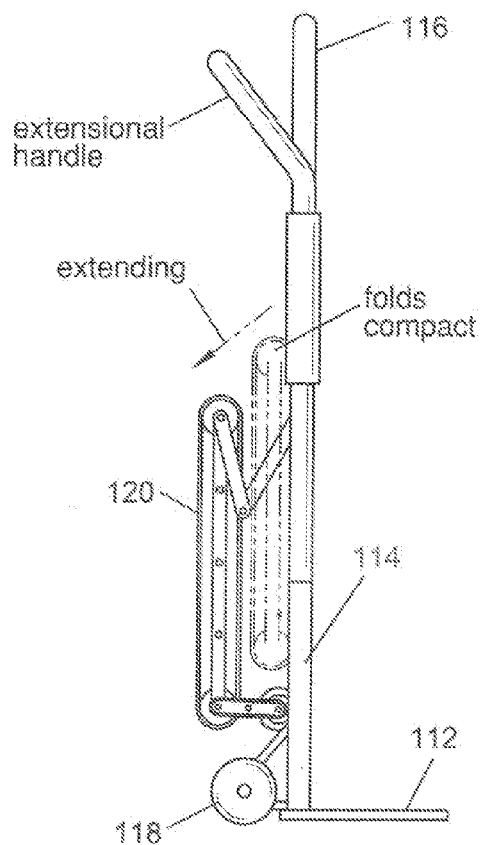
FIG. 1 is a side view of the system of the present invention.
Figure 2:
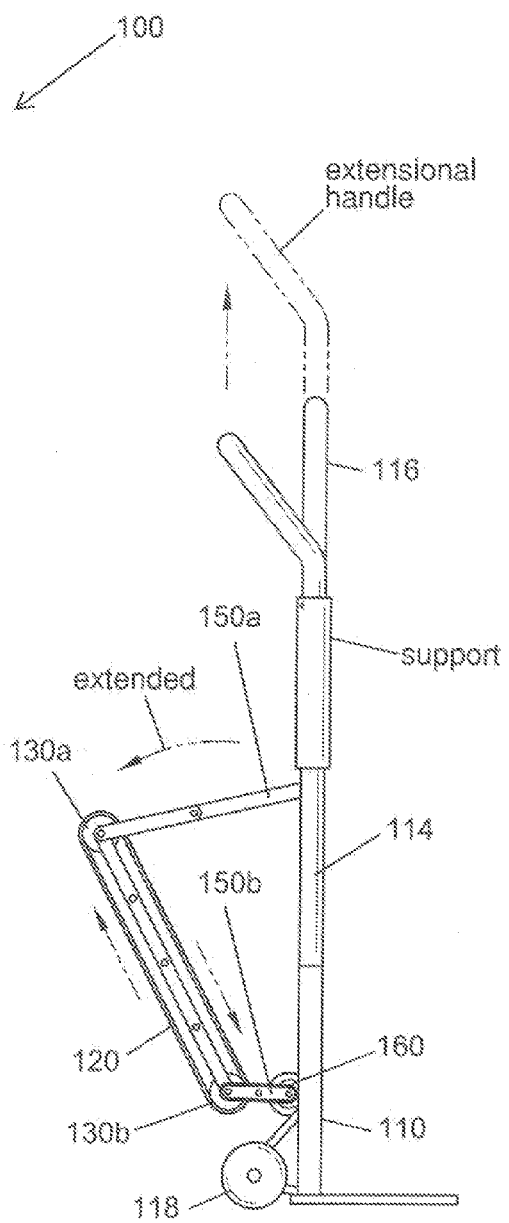
FIG. 2 is a side motion view of the system of the present invention.
Figure 3:
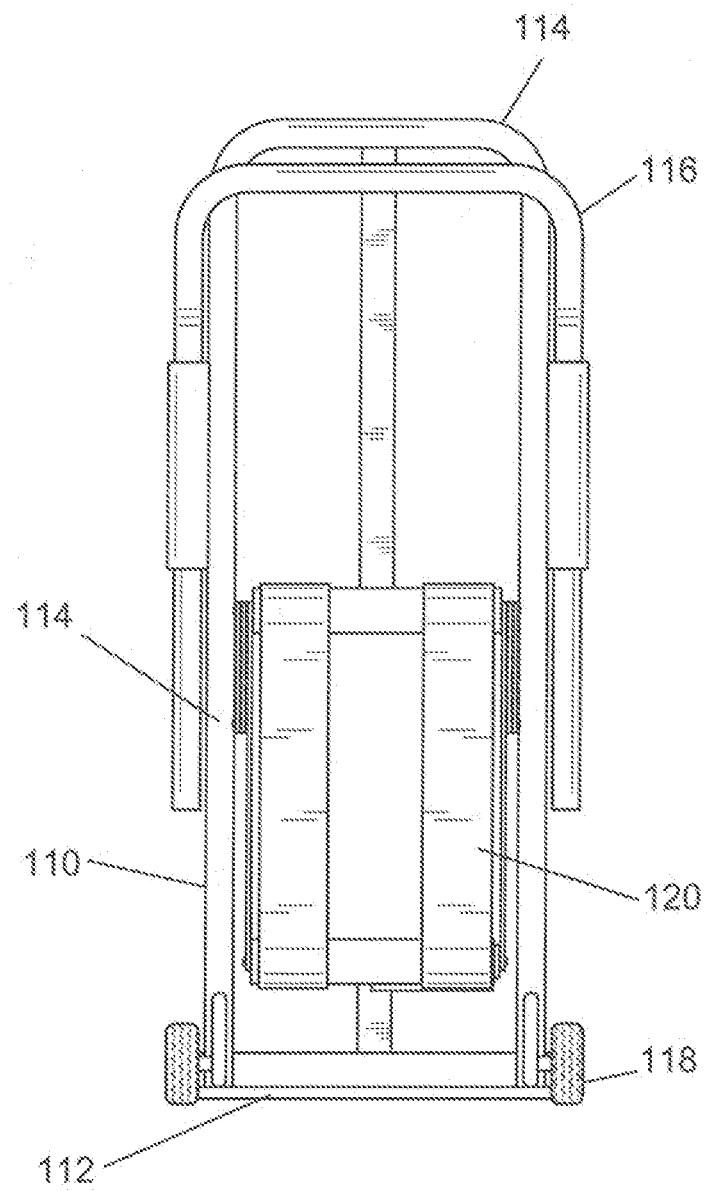
FIG. 3 is a back view of the system of the present invention.
Figure 4:
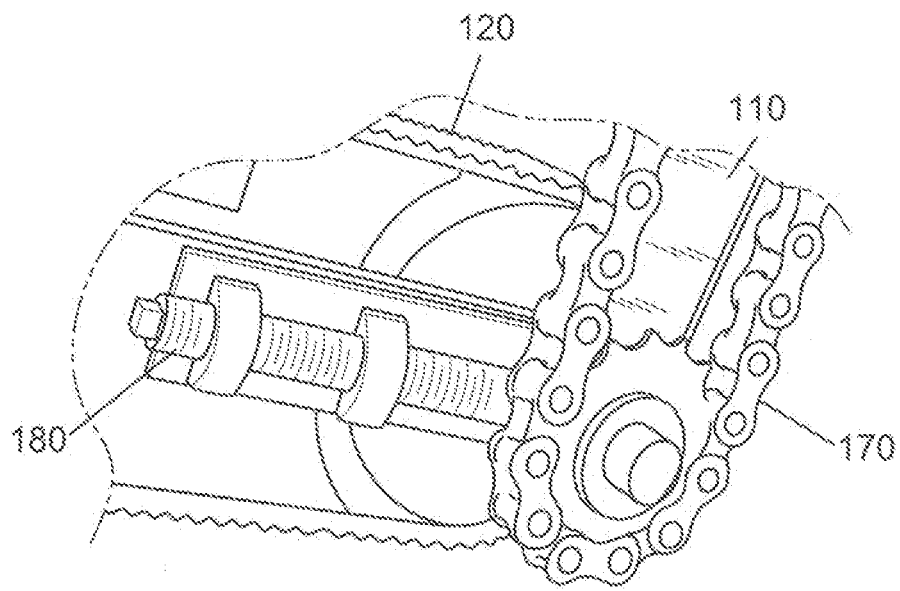
FIG. 4 is a detailed view of the system of the present invention.
Figure 5:
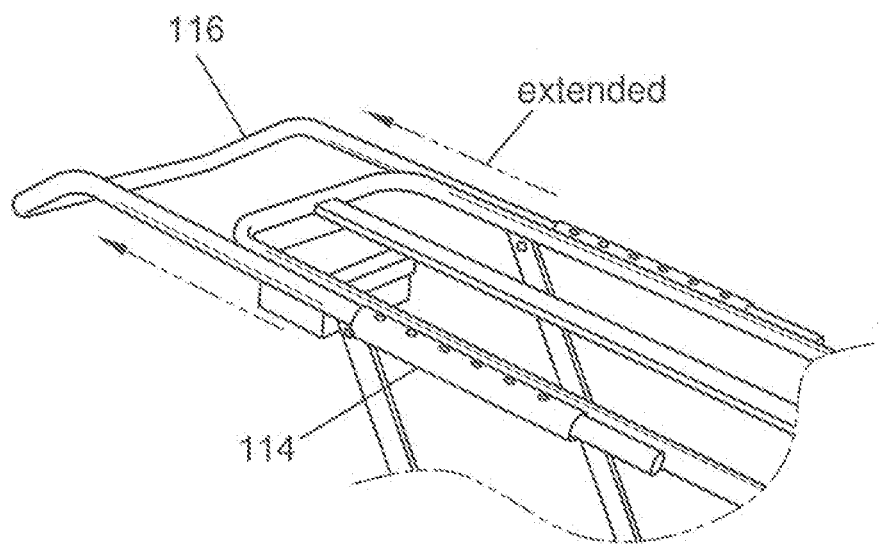
FIG. 5 is a detailed view of the system of the present invention.
Figure 6:
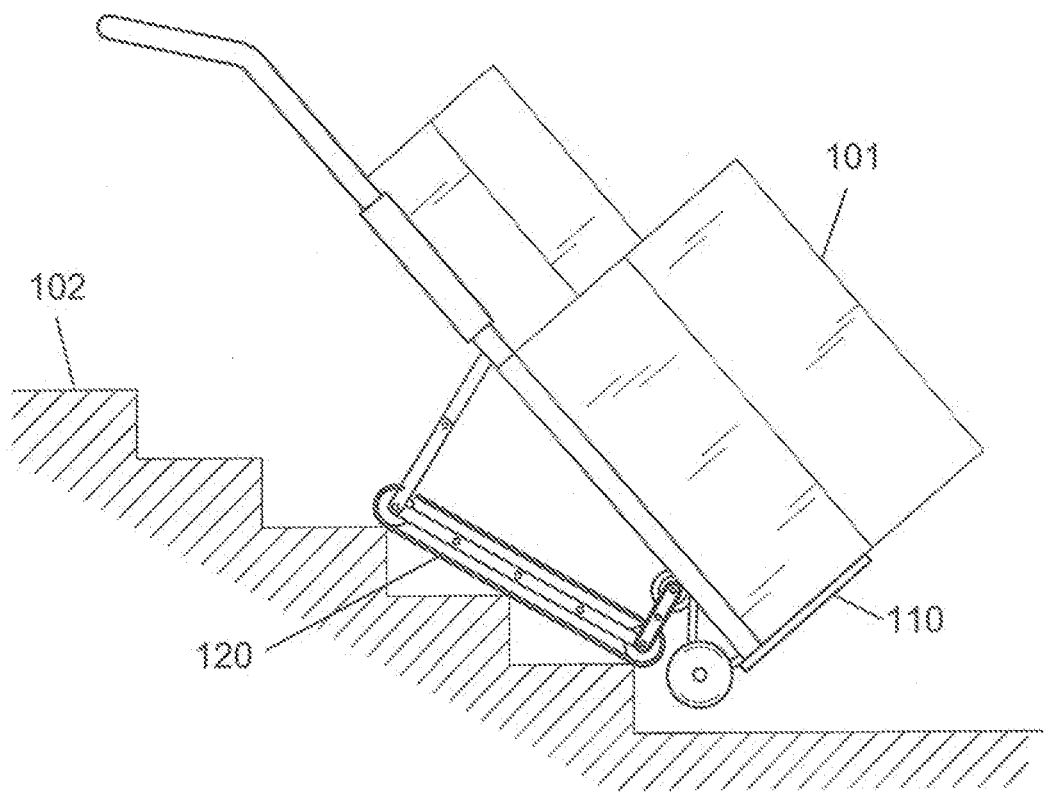
FIG. 6 is an in-use view of the system of the present invention.

Referring now to FIGS. 1-6, the present invention features a novel dolly system 100 for transporting objects (e.g., boxes 101) up and down stairs 102 (e.g., see FIG. 6).

The system 100 comprises a dolly 110. Dollies are well known to one of ordinary skill in the art. For example, the dolly 110 comprises a base platform 112 connected to support rails 114 and a handle 116 disposed at the top of the support rails 114. In some embodiments, the handle 116 (e.g., extension handle) is adjustable in height (e.g., via telescopic mechanisms). As shown in FIG. 5, the handle 116 can move with respect to the support rails 114 and can be secured in a preferred position. A pair of wheels 118 is disposed at the intersection of the base platform 112 and the bottom end of the support rails 114 (e.g., see FIG. 1, FIG. 2).

The system 100 further comprises a track belt 120 wrapped around a first rotator component 130a and a second rotator component 130b. Track belts are well known to one of ordinary skill in the art. The track belt 120 is adapted to rotate around the rotator components 130 (e.g., like a conveyor belt). The first rotator component 130b is connected to the support rails 114 of the dolly 110 via a first extension arm 150a, and the second rotator component 130b is connected to the support rails 114 of the dolly 110 via a second extension arm 150b. The first extension arm 150a is positioned closer to the handle 116 than is the second extension arm 150b (the second extension arm 150b is positioned at or near the wheels 118). The first extension arm 150a is longer than the second extension arm 150b. In some embodiments, the first extension arm 150a is collapsible (e.g., so as to move the first rotator component 130a closer to the support rails 114 when not in use (e.g., see FIG. 1).

The system 100 further comprises a motor 160. Motors are well known to one of ordinary skill in the art. The motor 160 is operatively connected to the second rotator component 130b via a chain 170 as shown in FIG. 4.

In some embodiments, the system 100 further comprises a track tensioner 180 for adjusting the tension of the track belt 120. Track tensioners are well known to one of ordinary skill in the art.

The disclosures of the following U.S. Patents are incorporated in their entirety by reference herein: U.S. Pat. No. 3,330,370; U.S. Pat. No. 3,362,496; U.S. Pat. No. 4,033,421; U.S. Pat. No. 4,142,732; U.S. Pat. No. 4,312,417; U.S. Pat. No. 4,368,896; U.S. Pat. No. 4,962,940; U.S. Design Pat. No. D404876; U.S. Pat. No. 6,155,362.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the

What is claimed is:

1. An electric dolly system (100) for transporting an object up and down stairs (102), said system (100) comprising:
   (a) a dolly (110) comprising a base platform (112) connected to a bottom end of support rails (114), a handle (116) disposed at a top end of the support rails (114), and a pair of wheels (118) disposed at an intersection of the base platform (112) and the bottom end of the support rails (114);
   (b) a track belt (120) wrapped around a first rotator component (130*a*) and a second rotator component (130*b*), the track belt (120) is adapted to rotate around the rotator components (130) like a conveyor belt, the first rotator component (130*a*) is connected to the support rails (114) of the dolly (110) via a first extension arm (150*a*) and the second rotator component (130*b*) is connected to the support rails (114) of the dolly (110) via a stationary second extension arm (150*b*), a track tensioner is disposed on the second rotator component (130*b*) for adjusting the tension of the track belt (120), the first extension arm (150*a*) is positioned closer to the handle (116) than is the second extension arm (150*b*), the first extension arm (150*a*) is longer than the second extension arm (150*b*) such that the track belt (120) is at an angle with respect to the support rails (114) of the dolly (110), the first extension arm 150*a* is foldably collapsible so as to move the first rotator component 130*a* closer to the support rails 114 when not in use; and
   (c) a motor (160) operatively connected to the second rotator component (130*b*) via a chain (170);
   wherein when the motor (160) is activated the motor (160) causes rotation of the track belt (120) about the rotator components (130).

2. The system (100) of claim 1, wherein the handle (116) can move with respect to the support rails (114) and can be secured in a preferred position.

* * * * *